April 26, 1960
J. H. GESELL
2,934,586
COAXIAL CABLE
Filed Nov. 10, 1958
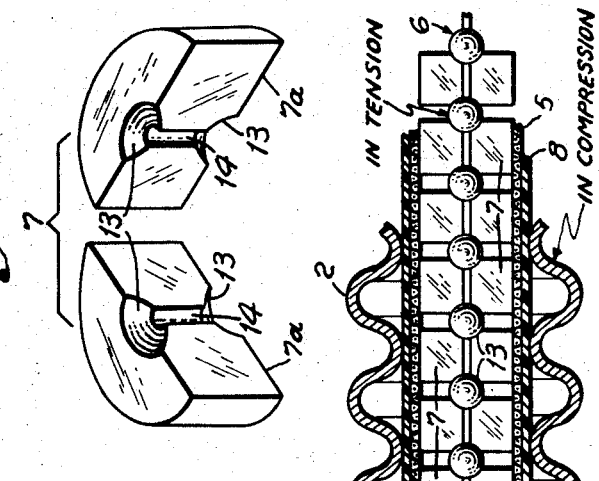
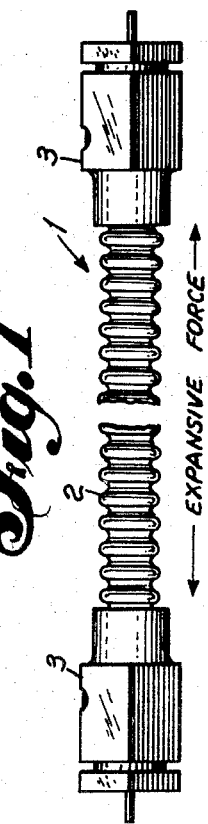
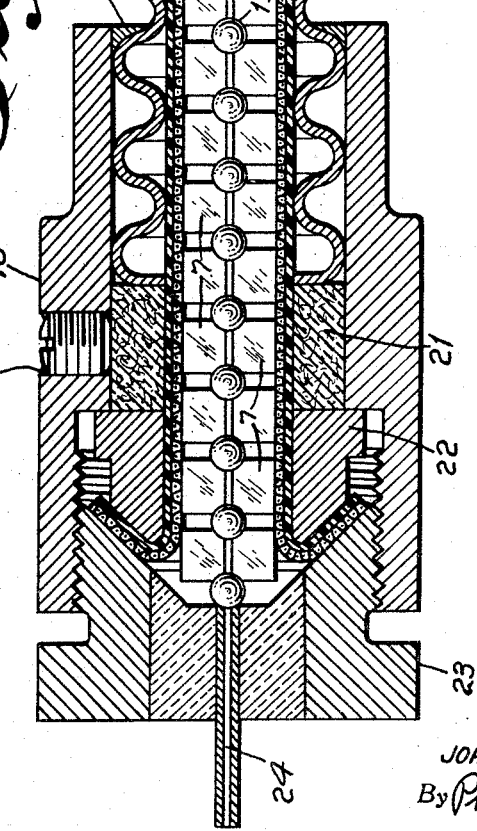
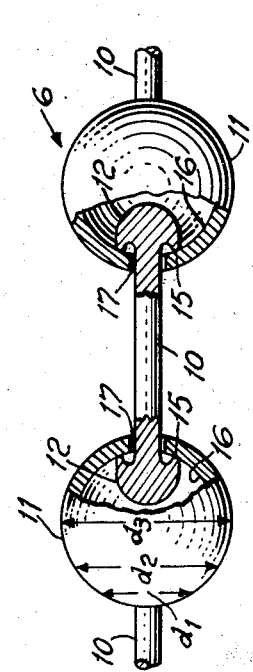
Inventor
JOHN H. GESELL
By *Philip M. Bolton*
Attorney United States Patent Office 2,934,586
Patented Apr. 26, 1960

2,934,586

COAXIAL CABLE

John H. Gesell, North Caldwell, N.J., assignor to International Telephone and Telegraph Corporation, Nutley, N.J., a corporation of Maryland Application November 10, 1958, Serial No. 773,036

6 Claims. (Cl. 174—28)

This invention relates to coaxial cables and more particularly to high temperature, flexible coaxial cables.

In present day systems, electrical components must be capable of withstanding extremes of environmental conditions. These components are designed to withstand large changes in acceleration, humidity and temperature depending on their application. Various schemes to ruggedize, seal and insulate these components are utilized to provide maximum reliability under these varying environmental conditions. The advent of rocketry and the resulting extraterrestial explorations have provided the ultimate test as far as quickly changing extremes of environment is concerned. Electronic and electrical components are put to the extreme test, in that light weight components are required which are rugged and which are capable of maintaining reliable operation under extremes of temperature. Most components have been successfully designed to meet these specifications and have kept pace with the trend toward more stringent requirements. The cable art, however, has been noticeably backward in providing coaxial cables which are light weight, rugged and which are capable of reliable operation under extremes of temperature. Many missile systems, particularly in their test stages, require that data from a vast number of components be transmitted from the missile or rocket to determine if they are operating properly and to pin-point malfunctions if they occur. This collection of data is obtained by telemetry; the transmission of conditions as they occur in a component from the missile by radio to a ground based receiver. The transmission of this data always requires an antenna and lead-in system to the transmitter which must remain operable in regions of high temperature at one instant and in regions of extreme low temperature at another instant. Antenna lead in cables being led from antennas in the missile tail must be led past the rocket motors to the telemetry transmitters, for instance, and must remain operable in temperature ranges up to 500° C. during burning time of the rocket engine. Upon burn-out, the temperature drops off and the cables are subjected to the intense cold of outer space and must still remain operable. These cables, then, are an important link in obtaining valuable data in rocket test vehicles and assume even more importance where they form the first link in command guidance systems which are utilized to program the path of the test vehicle.

Prior art coaxial cables have been adequate up until the present time, but there is an increasing demand for lighter, more flexible, high temperature coaxial cables. Prior art coaxial cables usually utilize a cable having a solid metallic center conductor with ceramic beads strung thereon in a nested configuration. These cables are extremely heavy, are not amenable to machine production and are not as flexible as is desired. A common failure in these prior art cables is the breaking and chipping of the beads when the cable is flexed. The electrical characteristics are also very poor and in general are only satisfactory because they are all that is available.

It is, therefore, an object of this invention to provide a high-temperature flexible coaxial cable which is superior to prior art cables.

It is a further object of this invention to provide a coaxial cable which is operable up to 500° C.

It is still a further object of this invention to provide a coaxial cable which is highly flexible and has good electrical characteristics.

A feature of this invention is the utilization of an inner conductor having a plurality of discrete articulately interconnected conductive members.

A further feature of this invention is the utilization of a plurality of dielectric beads which are composed of half-sections of the dielectric beads which are adapted to be mated about portions of said inner conductor. The half sections when mated, have a coaxially disposed cylindrical aperture to accept said portion of the inner conductor.

A still further feature of this invention is the utilization of means to maintain said inner conductor in tension to maintain positive electrical contact between portions of said inner conductor.

The above-mentioned and other features and objects of this invention will become more apparent by reference to the following description taken in conjunction with the accompanying drawings, in which:

Fig. 1 is a front elevational view of a cable and terminations, made in accordance with the principles of this invention;

Fig. 2 is a vertical sectional view of a portion of the cable and terminations shown in Fig. 1;

Fig. 3A is a partial vertical sectional view of an articulately interconnected male and female members which make up the center conductor of the coaxial cable in accordance with the principles of this invention; and Fig. 3B is a perspective view of a dielectric bead used in the practice of this invention.

Referring to Fig. 1, there is shown therein a section of high temperature, flexible coaxial cable 1 having a corrugated, stainless steel sheath 2 and terminated at its extremities by radio frequency terminations 3.

In Fig. 2, there is shown a partial cross-sectional view of the interior members of the coaxial cable and termination shown in Fig. 1. Coaxial cable 1 has an outer conductor 5 and an inner conductor 6, said inner conductor 6 being disposed coaxially of said outer conductor 5 and is composed of a plurality of discrete articulately interconnected members. Inner conductor 6 is maintained coaxially of outer conductor 5 by a plurality of split dielectric beads 7 which are disposed coaxially of and in contacting relationship with portions of outer conductor 5 and inner conductor 6. Outer conductor 5 is a flexible conductor, such as for example, a braid of suitable conductive metal, such as, copper, which is woven about the circumference of the dielectric beads 7. The outer diameter of the dielectric beads 7 determines the inner diameter of the outer conductor 5. An insulating layer 8 overlies the braided outer conductor 5 and consists, for example, of a glass yarn or a high silica glass yarn commercially known as "Refraisil." Overlying the insulating layer 8 is a metallic corrugated sheath 2 preferably made of stainless steel, Monel or similar alloys to provide high heat resistance qualities and flexibility to coaxial cable 1. Referring to Fig. 3A, the details of the inner conductor 6 are there shown. Inner conductor 6 is composed of a plurality of articulately interconnected male and female conductive members 10 and 11, respectively, which are periodically disposed along the length of coaxial cable 1. The female members or hollow spheres 11 are interconnected by means of the male members or links 10 in such a way that each link 10 is attached at its extremities to sphere 11. Links 10 have a given diameter and have at their extremities bulbous heads 12 which prevent links 10 from slipping out of the spheres 11. By this means, the spheres 11 and links 10 are articulately interconnected and a maximum flexibility is obtained with no substantial effect on the electrical characteristics of the cable. It is important to note that the type of interconnection hereinabove described provides for maximum flexibility and that the connection of sphere 11 and links 10 has a freedom of movement approximately that of a universal joint.

It should also be noted at this point that the female portions or spheres 11 need not have a spherical form. These female portions may be cylindrical, ellipsoidal or any shape which does not provide an abrupt discontinuity to electromagnetic energy being propagated along coaxial cable 1. Thus, at the point where the female portion 11 meets the male portion 10, it should be of substantially the same diameter as the diameter of male portion 10. In Fig. 3A, therefore an electromagnetic wave in the region of one of the male portions 10 would encounter a member of given diameter. The wave passing into the region of one of the female members 11 would encounter, as it passes along the line, a member having gradually increasing cross-sectional dimension, as indicated by the chords $d_1$, $d_2$, on the cross-section of female portion 11, until it reaches the maximum cross-sectional dimension of the female portion, designated $d_3$. The female portion then tapers down in the same fashion until it again approaches the diameter of male portion 10.

The dielectric beads 7 perform the dual function of spacing the inner conductor 6 from outer conductor 5 and of compensating for the change in diameter from the male portion 10 to female portion 11 of inner conductor 6. The change in diameter of these portions of the inner conductor would cause an electromagnetic wave to encounter abrupt changes in impedance if compensation were not provided in the region of the male portion or link 10. The impedance of the coaxial cable, then, is made substantially constant by increasing the dielectric constant in the region of male portion 10 in accordance with the well known formula:

$$Z_0 = \frac{138}{\sqrt{\epsilon}} \log_{10} \frac{D}{d} \text{ wherein}$$

$Z_0$=the characteristic impedance of the coaxial cable
$\epsilon$=dielectric constant
$D$=inner diameter of outer conductor
$d$=outer diameter of inner conductor The above equation indicates that the impedance is governed only by the dimensions of the cable and by the materials involved. Because of this, only the tolerances with respect to diameters and dielectric constant are relatively critical. Dimensions in the direction parallel to the longitudinal axes, therefore, are not critical and slight changes in tolerances can be allowed in that these changes contribute to the flexibility of the cable 1.

Fig. 3B shows a dielectric bead 7 which is representative of the type used in the practice of this invention. Dielectric bead 7 which is preferably made of a high temperature low loss ceramic, is composed of half-sections 7a and contains depressions 13 in the end portions thereof to receive sections of female portion 11 of inner conductor 6 therein. Thus, a section of female portion 11 is nested in depressions 13 which are properly shaped to receive said section of said female portion 11. The depressions 13 perform a dual function; in one instance, they allow greater flexibility for the cable by providing, in the manner of a ball-and-socket joint, a structure which may be easily articulated; and in the other instance, provides for a gradual tapering of the dielectric as the center conductor changes from the larger diameter female portion 11 to the smaller diameter male portion 10. In this manner, reflections due to abrupt discontinuities are minimized. The dielectric beads 7 are made up of half-section 7a to permit machine assembly of the coaxial cable 1. Because of this feature, coaxial cable 1 may be manufactured on a mass-production basis as opposed to the laborious hand-assembly of stringing beads on a center conductor as is done with some prior art cables. The half-sections 7a, then, are mated about links 10 and a coaxially disposed aperture composed of half cylindrical apertures 14 accepts links 10 and permits their passage through dielectric bead 7. The outer conductor braid 5 is then woven thereover and the mated half-sections 7a are held in substantially fixed position with respect to each other.

Returning to a consideration of Figs. 2 and 3A, it should be noted in Fig. 3A that link 10 has disposed at its extremities bulbous or expanded portions 12 confined within the spheres 11. These expanded portions 12, clearly are meant to connect links 10 and spheres 11 together to form the inner conductor 6. The expanded portions 12, however, perform another function and this is to maintain good electrical contact between the links 10 and spheres 11. This is accomplished by having annular rounded ridge 15 bear against the inner surface 16 of balls 11 in the region of apertures 17. These cables, as has been mentioned previously, are subjected to extremes of heat and cold, and expansion and contraction of the various elements which make up cable 1 can be expected. In the course of these contractions and expansions, the links 10 may, for instance, change in length to such a degree that poor electrical contact between the spheres 11 and links 10 ensues. To overcome this deleterious feature, a scheme for maintaining positive electrical contact under all conditions has been supplied, as may be seen from a reconsideration of Fig. 2.

In Fig. 2, radio frequency termination 3 is shown terminating coaxial cable 1. Radio frequency connectors of a type well known to those skilled in the art could also be used without departing from the teaching of this invention. During assembly of coaxial cable 1 and termination 3, corrugated sheath 2 has a compressive force applied thereto. While this compressive force is being maintained, a steel sleeve 18 having a gas port 19 disposed therein, for the introduction of an inert gas under pressure, is welded at 20 to corrugated sheath 2. A gasket 21, made of quartz-felt and a steel clamping ring 22 are introduced coaxially of the axis of cable 1. The outer conductor 5 and the insulating layer 8 are turned back against braid clamping ring 22. A steel and glass hermetic seal member 2 is then screwed into a female portion on sleeve 18 such that the braided outer conductor 5 and insulation 8 are tightly held against clamping ring 22. An extension 24 of inner conductor 6 is passed through the fittting 3 and by suitable means is crimped, soldered and sealed in fixed position with respect to said hermetic seal member 23. Upon completion of this assembly, the aforementioned compressive force is removed from the sheath 2. The sheath, however, is now constrained by the terminations 3 and cannot return to its initial condition. An expansive force, therefore, is applied through the weld steel sleeve 18 and hermetic seal member 23 to extension 24 of inner conductor 6. Since extension 24 is fixed with respect to termination 3, the expansive force is transmitted by the coaction of sheath 2, termination 3 and termination members 23, 24 in cooperatively engaging relationship to inner conductor 6 which places said inner conductor under tension, thereby maintaining good electrical contact between spheres 11 and links 10 under all conditions of temperature by holding ridge 15 tightly against the inner surface 16 of spheres 11.

The coaxial cable described herein is not limited to the application outlined previously, but may be used in any application where armored cable is required. Cables of this type are best applied in a frequency range which has a maximum frequency of approximately 500 mc. After this point, the voltage standing wave ratio starts to approach a prohibitive value.

While I have described above the principles of my invention in connection with specific apparatus, it is to be clearly understood that this description is made only by way of example and not as a limitation to the scope of my invention as set forth in the objects thereof and in the accompanying claims.

I claim:

1. A high temperature flexible coaxial cable comprising an inner and outer conductor, said inner conductor having a plurality of discrete articulately interconnected conductive solid and hollow members, a plurality of dielectric beads disposed coaxially of and conformal with said solid member and having end portions adapted to mate with portions of adjacent ones of said hollow members to provide a gradual impedance match for electromagnetic energy as it passes from a solid to a hollow member, said beads being in surrounding contacting relationship with said solid members, said portions of adjacent ones of said hollow members and said beads being periodically disposed along the length of said cable.

2. A high temperature flexible coaxial cable according to claim 1 wherein said dielectric beads are composed of half-sections of said dielectric beads to permit machine assembly, adapted to be mated about portions of said inner conductor and having, when mated, a coaxially disposed cylindrical aperture to accept said solid portion of said inner conductor.

3. A flexible radio frequency transmission line comprising an inner conductor and an outer conductor, said inner conductor having discrete first and second portions periodically disposed along the length of said transmission line, said first portion having a given diameter, said second portion tapering from said given diameter to another diameter larger than said given diameter, a plurality of dielectric beads disposed coaxially of said first portion and in contacting relationship with said first portion and said outer conductor, said dielectric bead containing depressions in the end portions thereof to receive sections of said second portion therein to provide a smooth impedance transformation for electromagnetic energy as it passes from one of said first to one of said second portions, and means to maintain said inner conductor in tension to maintain positive electrical contact between said first and second portions.

4. A flexible radio frequency transmission line comprising outer conductor, an inner conductor, said inner conductor having spheres articulately interconnected by and to links having bulbous heads confined within said spheres, said links having a smaller diameter than said spheres, a plurality of split dielectric beads disposed coaxially of said links in contacting relationship with said links and sections of adjacent spheres and said outer conductor, and means to maintain said inner conductor in tension to maintain positive electrical contact between said spheres and said links.

5. A flexible radio frequency transmission line according to claim 4 wherein said means to maintain said inner conductor in tension comprises a corrugated tubular sheath in compression, terminated at its extremities by radio frequency terminations, said radio frequency terminations having members rigidly fixed thereto adapted to be connected to said inner conductor, said sheath, said terminations and said termination members coacting in cooperatively engaging relationship to maintain said inner conductor under tension.

6. A flexible radio frequency transmission line comprising a braided outer conductor, an inner conductor, said inner conductor having spherical hollow members articulately interconnected by and to links having bulbous heads confined within said spherical hollow members, said links having a smaller diameter than said hollow members, a plurality of split dielectric beads disposed coaxially of said links in contact relationship with said links and sections of adjacent spheres and said outer conductor to support said inner conductor and to provide a gradual impedance transformation for electromagnetic energy as it passes from one of said length to one of said spheres, said outer conductor being in overlying relation with said beads, an insulating, woven sheath overlying said outer conductor and a corrugated flexible sheath overlying said insulating sheath.

References Cited in the file of this patent

UNITED STATES PATENTS

| 815,498 | Weir | Mar. 20, 1906 |
| 2,416,979 | Burley | Mar. 4, 1947 |

FOREIGN PATENTS

| 133,440 | Austria | May 26, 1933 |
| 422,958 | Great Britain | Jan. 18, 1935 |